(12) United States Patent
Hara

(10) Patent No.: US 11,465,544 B2
(45) Date of Patent: Oct. 11, 2022

(54) VEHICLE

(71) Applicant: Toyota Jidosha Kabushiki Kaisha, Toyota (JP)

(72) Inventor: Yasuhiro Hara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 16/718,926

(22) Filed: Dec. 18, 2019

(65) Prior Publication Data
US 2020/0223347 A1 Jul. 16, 2020

(30) Foreign Application Priority Data
Jan. 11, 2019 (JP) .............................. JP2019-003617

(51) Int. Cl.
*B60P 1/43* (2006.01)
*B62D 25/20* (2006.01)
*A61G 3/06* (2006.01)

(52) U.S. Cl.
CPC .......... *B60P 1/433* (2013.01); *B62D 25/2054* (2013.01); *A61G 3/062* (2013.01)

(58) Field of Classification Search
CPC .... B60N 2/245; A61G 3/061; B62D 25/2054; B60P 1/433
See application file for complete search history.

(56) References Cited

U.S. PATENT DOCUMENTS

| 4,339,224 | A | * | 7/1982 | Lamb ..................... | A61G 3/063 410/1 |
| 4,457,663 | A | * | 7/1984 | Hems ...................... | A61G 3/06 414/539 |
| 5,160,236 | A | * | 11/1992 | Redding ................ | A61G 3/061 14/71.1 |
| 5,380,144 | A | * | 1/1995 | Smith .................... | A61G 3/061 14/71.3 |
| 5,636,399 | A |  | 6/1997 | Tremblay et al. | |
| 5,832,555 | A | * | 11/1998 | Saucier .................. | B60P 1/431 14/71.1 |
| 6,179,545 | B1 | * | 1/2001 | Petersen, Jr. .......... | A61G 3/061 14/71.7 |
| 9,050,229 | B1 | * | 6/2015 | Morris ................... | A61G 3/061 |
| 9,256,852 | B1 |  | 2/2016 | Myllymaki | |
| 2009/0195037 | A1 | * | 8/2009 | Plavetich ............... | B60N 2/062 297/257 |
| 2017/0008490 | A1 |  | 1/2017 | Sako et al. | |
| 2018/0099705 | A1 |  | 4/2018 | Faruque et al. | |
| 2019/0126783 | A1 | * | 5/2019 | Baccouche .......... | B60N 2/0292 |
| 2019/0220811 | A1 |  | 7/2019 | Naito et al. | |

(Continued)

FOREIGN PATENT DOCUMENTS

CN 108909635 A * 11/2018 .............. A61G 3/06
JP S56-132952 A 10/1981

(Continued)

*Primary Examiner* — Kaitlin S Joerger
(74) *Attorney, Agent, or Firm* — Dinsmore & Shohl LLP

(57) ABSTRACT

A vehicle includes: a vehicle cabin having a flat floor surface and being configured such that a user can embark; an entrance through which the user can embark and can disembark; a ramp that, at the entrance, extends from the floor surface toward a vehicle exterior; and a turntable that is provided at the floor surface and configured to enable directional change.

16 Claims, 9 Drawing Sheets

(56) References Cited

U.S. PATENT DOCUMENTS

2019/0247248 A1\*  8/2019  Perkins .................. B60P 1/431
2020/0122642 A1\*  4/2020  Sato ....................... A61G 3/061

FOREIGN PATENT DOCUMENTS

| | | | | |
|---|---|---|---|---|
| JP | S60089048 A | 5/1985 | | |
| JP | H05278648 A | 10/1993 | | |
| JP | H0994268 A | \* 4/1997 | .............. | A61G 3/00 |
| JP | H09224976 A | \* 9/1997 | .............. | A61G 5/00 |
| JP | 2015-003809 A | 1/2015 | | |
| JP | 2016-115364 A | 6/2016 | | |
| JP | 2018-162162 A | 10/2018 | | |
| KR | 10-2018-0060068 A | 6/2018 | | |

\* cited by examiner

VEHICLE

CROSS-REFERENCE TO RELATED APPLICATION

This application is based on and claims priority under 35 USC 119 from Japanese Patent Application No. 2019-003617 filed on Jan. 11, 2019, the disclosure of which is incorporated by reference herein.

BACKGROUND

Technical Field

The present disclosure relates to a vehicle.

Related Art

Japanese Patent Application Laid-open No. 2018-162162 discloses a vehicle that enables delivery of a package by means of autonomous driving. The vehicle of this document, requires that a package be received outside of the vehicle and there is a possibility that the package or the recipient will become wet if it is raining. Further, in a case in which, in this vehicle, the recipient enters the vehicle cabin to receive the package, the recipient's movements are restricted to the extent that package storage space is maximized.

For example, in a case in which the recipient is a wheelchair user or a case in which the recipient uses a trolley, there is room for improvement in terms of making it easier to move inside the vehicle cabin.

SUMMARY

The present disclosure aims to provide a vehicle that can ensure room for movement by a person seated in a wheelchair or a person using a trolley even inside a vehicle cabin in which a package is stored.

A vehicle of a first aspect includes: a vehicle cabin having a flat floor surface and being configured such that a user can embark; an entrance through which the user can embark and can disembark; a ramp that, at the entrance, extends from the floor surface toward a vehicle exterior; and a turntable that is provided at the floor surface and configured to enable directional change.

The vehicle of the first aspect is provided with a ramp and enables a user seated in a wheelchair or a user using a trolley to embark. Further, the vehicle is provided with a turntable at a floor surface inside the vehicle cabin, which enables directional, change of a wheelchair or a trolley. Accordingly, with this vehicle, room for movement by a person seated in a wheelchair or a person using a trolley can be secured even inside a vehicle cabin in which a package is stored.

A vehicle of a second aspect features, in the vehicle of the first aspect, the ramp being stored under the floor surface at a position that is separated from an installment position of the turntable in a case in which the vehicle cabin is viewed in plan view.

According to the vehicle of the second aspect, a lower floor configuration of the vehicle cabin can be achieved as compared to a case in which the installment position of the turntable and the storage position of the ramp overlap in plan view.

A vehicle of a third aspect further includes, in the vehicle of the first or second aspect, a vehicle interior imaging, section that images an interior of the vehicle cabin; and a rotation control section that rotatably controls the turntable based on an image, captured by the vehicle interior imaging section, of a user seated in a wheelchair in the vehicle cabin.

According to the vehicle of the third aspect, the turntable can be rotated in a case in which the user that has embark is seated in a wheelchair.

A vehicle of a fourth aspect further includes, in the vehicle of the third aspect, a transfer section that is provided at the vehicle cabin and that is configured to enable transfer of a package to the user, the rotation control section rotating the turntable based on a transfer of the package to the user at the transfer section.

According to the vehicle of the fourth aspect, in a case in which transfer of a package to a user is complete, the operational burden on a user using a wheelchair or a trolley can be reduced by rotation of the turntable.

A vehicle of a fifth aspect further includes, in the vehicle of the third or fourth aspect, a control unit that controls autonomous driving of the vehicle; an opening section provided at the vehicle cabin, which makes an accommodated package available to the user in a specific open state; an authentication section that authenticates whether a person present at the vehicle exterior as a user who is permitted to embark the vehicle cabin; and an opening control section that, in a case in which the authentication section has authenticated the user, opens the entrance and, in addition, places the opening section in the open state.

The vehicle of the fifth aspect is an autonomous driving vehicle that does not necessarily require a driver to be aboard. This vehicle is provided with an authentication section that authenticates a user's entry to the vehicle cabin, and with an opening control section that, in a case of authentication, performs processing. Further, the opening control section opens the entrance and, in addition, opens the opening section corresponding to the user's package. Accordingly, in this vehicle, since the opening of the entrance and the opening of an opening section separating the package from the user can be performed via a single authentication, the inconvenience of the user performing a two-stage verification can be eliminated.

A vehicle of a sixth aspect further includes, in the vehicle of the third or fourth aspect, a control unit that controls autonomous driving of the vehicle; an authentication section for authenticating the user coming aboard at the entrance; a receiving section configured to enable the user on the turntable to receive the package; and a movement mechanism that moves the package to the receiving, section based on authentication of the user by the authentication section, the rotation control section rotating the turntable in a case in which the user has received the package at the receiving section.

In the vehicle of the sixth aspect, the package can be moved to a receiving section that can be reached by the user's hands without the user moving through, the vehicle, cabin in order to receive the package. Further, in this vehicle, the receiving section is provided within a range that can be reached by the hands of a user on the turntable. As a result, in this vehicle, the operational burden on a user using a wheelchair or a trolley can be reduced when receiving a package.

According to the present disclosure, room for movement by a person seated in a wheelchair or a person using a trolley can be secured even inside a vehicle cabin in which a package is stored.

BRIEF DESCRIPTION OF THE DRAWINGS

Exemplary embodiments of the present disclosure will be described in detail based on the following figures, wherein.

DETAILED DESCRIPTION

A vehicle according to exemplary embodiments of the present disclosure is explained using drawings. It should be noted that in the respective drawings, arrow FR indicates the vehicle front, arrow UP indicates an upward direction relative, to the vehicle, and arrow RH indicates the right-hand side in a vehicle transverse direction.

First Exemplary Embodiment (Configuration)

Figure 1:
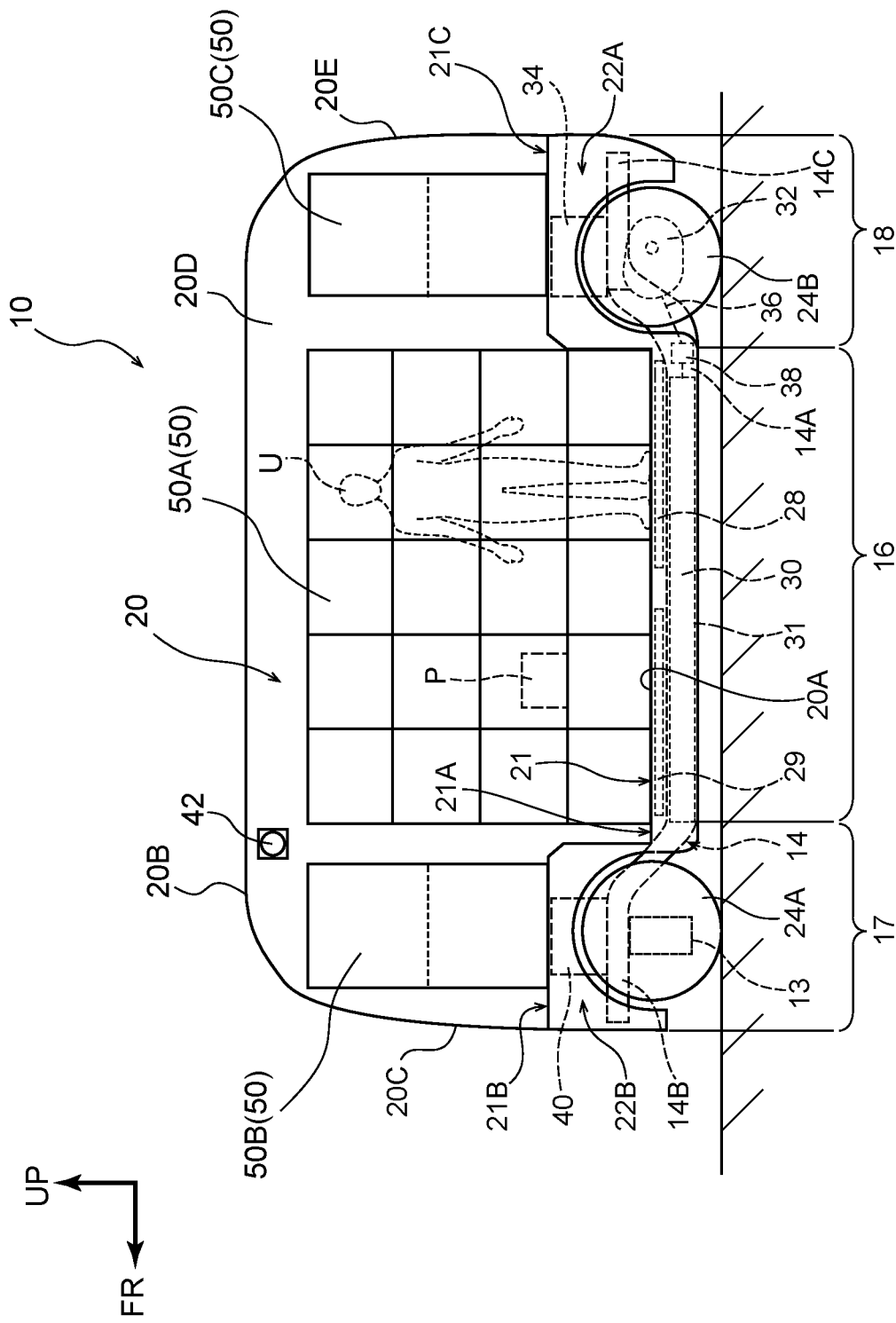
FIG. 1 is a side view of a vehicle cabin in a vehicle according to a first embodiment.
Figure 2:
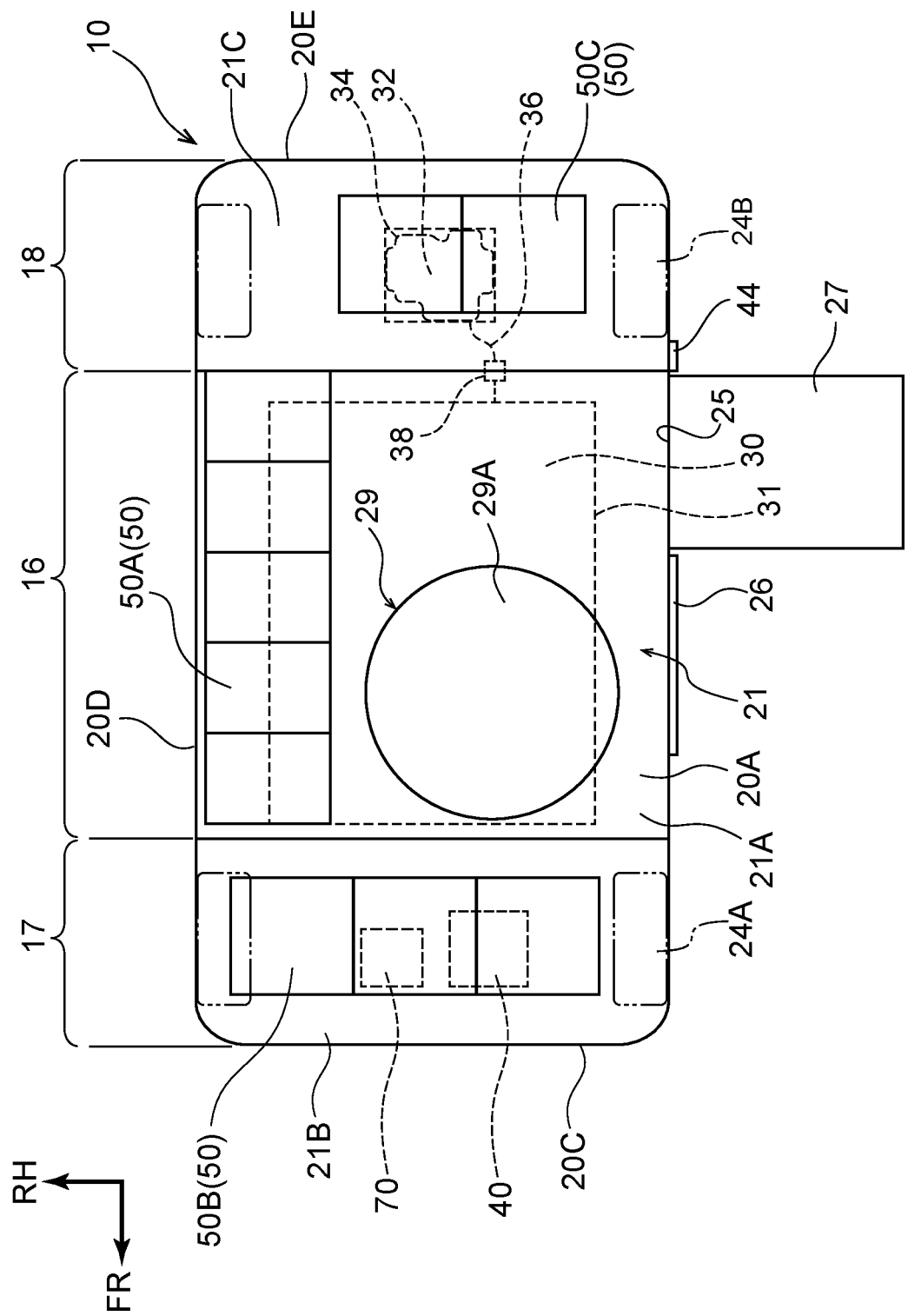
FIG. 2 is a plan view of the vehicle cabin in the vehicle according to the first embodiment.

Vehicle 10 of the present exemplary embodiment is an electric automobile that enables fully autonomous driving. As shown in FIG. 1 and FIG. 2, the outer appearance of vehicle 10 is that of a substantially rectangular parallelepiped surrounded by roof 20B, front wall part 20C, side wall part 20D and rear wall part 20E, and front wheel 24A is provided at the vehicle front and rear wheel 24B is provided at the vehicle rear.

Vehicle 10 of the present exemplary embodiment is configured by joining together plural modules. Vehicle 10 includes center module 16, which configures a central portion in a vehicle front-rear direction, front module 17, which is joined to a vehicle front side of center module 16, and rear module 18, which is joined to a vehicle rear side of center module 16. Front module 17 and center module 16 are divided at a boundary at a portion slightly to the vehicle rear of front wheel 24A, and center module 16 and rear module 18 are divided at a boundary at a portion slightly to the vehicle front of rear wheel 24B. Here, in the following explanation, along the vehicle front-rear direction of vehicle 10, a portion at which front module 17 is present is designated as the vehicle front part, a portion at which center module 16 is present is designated as the vehicle central part, and a portion at which rear module 1$ is present is designated as the vehicle rear part (the same applies to other embodiments).

It should be noted that center module 16, front module 17 and rear module 18 may be modules that respectively only configure a lower side of the vehicle. In such a case, vehicle 10 is formed by further joining a roof module, configuring a vehicle upper side, to the joined center, module 16, front module 17 and rear module 18.

As shown in FIG. 1, center module 16 includes a central portion, in the vehicle front-rear direction, of side wall part 20D, and battery case 31, which is described below. It should be noted that plural types of center module 16 having different lengths in the vehicle front-rear direction may be prepared, and vehicle 10 may be configured so as to enable modification of the total length thereof.

Front module 17 includes front wall part 20C, a vehicle front portion of side wall part 20D, autonomous driving unit 40, and control device 70 (refer to FIG. 2).

Rear module 18 includes rear wall part 20E, a vehicle rear portion of side wall part 20D, drive unit 32, and power unit 34.

A pair of side members 14 extending in the vehicle front-rear direction is provided at a vehicle lower side of vehicle 10. These side members 14 have center side member 14A extending from a vehicle rear, side of front wheel 24A to a vehicle front side of rear wheel 24B, and front side member 14B extending toward the vehicle front after bending from center side member 14A toward a vehicle transverse direction inner side and a vehicle upper side. Further, side members 14 have rear side member 14C extending toward the vehicle rear after bending from center side member 14A toward a vehicle transverse direction inner side and a vehicle upper side. It should be noted that center side member 14A is provided at center module 16, front side member 14B is provided at front module 17, and rear side member 14C is provided at rear module 18.

Front axle 13, which supports front wheel 24A, is fixed to front side member 14B, and drive unit 32 for driving rear wheel 24B is fixed to rear side member 14C.

Vehicle 10 is provided with vehicle rear part power unit chamber 22A, vehicle front part sub-unit chamber 22B, and vehicle cabin 20, which, is partitioned from power unit chamber 22A and sub-unit chamber 22B by floor panel 21.

Power unit chamber 22A of the present exemplary embodiment is a portion at a vehicle lower side in the vehicle rear part, and is provided as a space having a range that surrounds rear wheel 24B in lateral view. Power unit chamber 22A accommodates power unit 34, which is a high-voltage component, in addition to drive unit 32. Drive unit 32 has at least a motor for travel and a transaxle provided as a unit. Further, power unit 34 has at least a boost converter and an inverter provided as a unit. Power unit 34 is electrically connected by power source cable 36 from battery 30, which is discussed below. It should be noted that power source cable 36 is provided with electric power connector 38 at joint parts with center module 16 and rear module 18.

Sub-unit chamber 22B in the present exemplary embodiment is a portion at a vehicle lower side in the vehicle front part, and is provided as a space having a range that surrounds front wheel 24A in lateral view. Sub-unit chamber 22B accommodates autonomous driving unit 40, which is a control unit, and control device 70 (refer to FIG. 2). Autonomous driving unit 40 includes, for example, an autonomous driving ECU that controls autonomous driving of vehicle 10, and an interface ECU that controls communications between a steering unit and an acceleration/deceleration unit. Further, autonomous driving unit 40 is connected, by signal cables, to plural sensors that acquire the situation peripheral to vehicle 10. These sensors include cameras that capture a prescribed range, millimeter-wave radars that transmit probe waves to a prescribed range, and LIDAR (Light Detection and Ranging/Laser Imaging Detection and Ranging) that scan a prescribed range.

Battery 30 is accommodated below the floor of vehicle cabin 20; specifically, at a vehicle lower side of floor panel 21 at the vehicle central part. Further, battery 30 is provided between the pair of center side members 14A provided at the vehicle central part, and is accommodated in battery case 31, which is fixed relative to center side members 14A.

In the present exemplary embodiment, floor surface 20A is formed as a floor from floor panel 21, which partitions vehicle cabin 20 from power unit chamber 22A, sub-unit chamber 22B and battery case 31. Floor panel 21 has low floor part 21A provided at the vehicle central part, front high floor part 21B at which the position of floor surface 20A is higher than at low floor part 21A, and rear high floor part 21C at which the position of floor surface 20A is higher than at low floor part 21A.

Autonomous driving unit 40 and control device 70 (refer to FIG. 2) are disposed at a vehicle lower side of front high floor part 21B, and front high floor part 21B is positioned further toward a vehicle upper side than a wheel axle of front wheel 24A. Further, drive unit 32 and power unit 34 are positioned at a vehicle lower side of rear high floor part 21C, and rear high floor part 21C is positioned further toward a vehicle upper side than a wheel axle of rear wheel 24B. It should be noted that while front high floor part 21B and rear high floor part 21C have substantially the same height in the present exemplary embodiment, different heights are also acceptable.

Low floor part 21A is positioned further toward a vehicle lower side than a wheel axle of front wheel 24A and of rear wheel 24B. Battery case 31 is disposed at a vehicle lower side of low floor part 21A. Further, vehicle cabin 20 is formed with a height, enabling user U of vehicle 10 to board low floor part 21A with an upright posture. Here user U is a person that comes to vehicle 10 to receive a package. As this user U, a dummy having a standard (average) adult physique—for example, an AM50-type (50th percentile adult American male) dummy of the World Side Impact Dummy (World SID)—can be used as an example. That is, vehicle cabin 20 has a height that generates clearance between roof 20B and the head of an AM50-type dummy standing upright on tow floor part 21A. It should be noted that the example of user U is not limited to the AM50-type dummy, and other impact dummies or statistically acquired standard physique models can be used.

Figure 3:
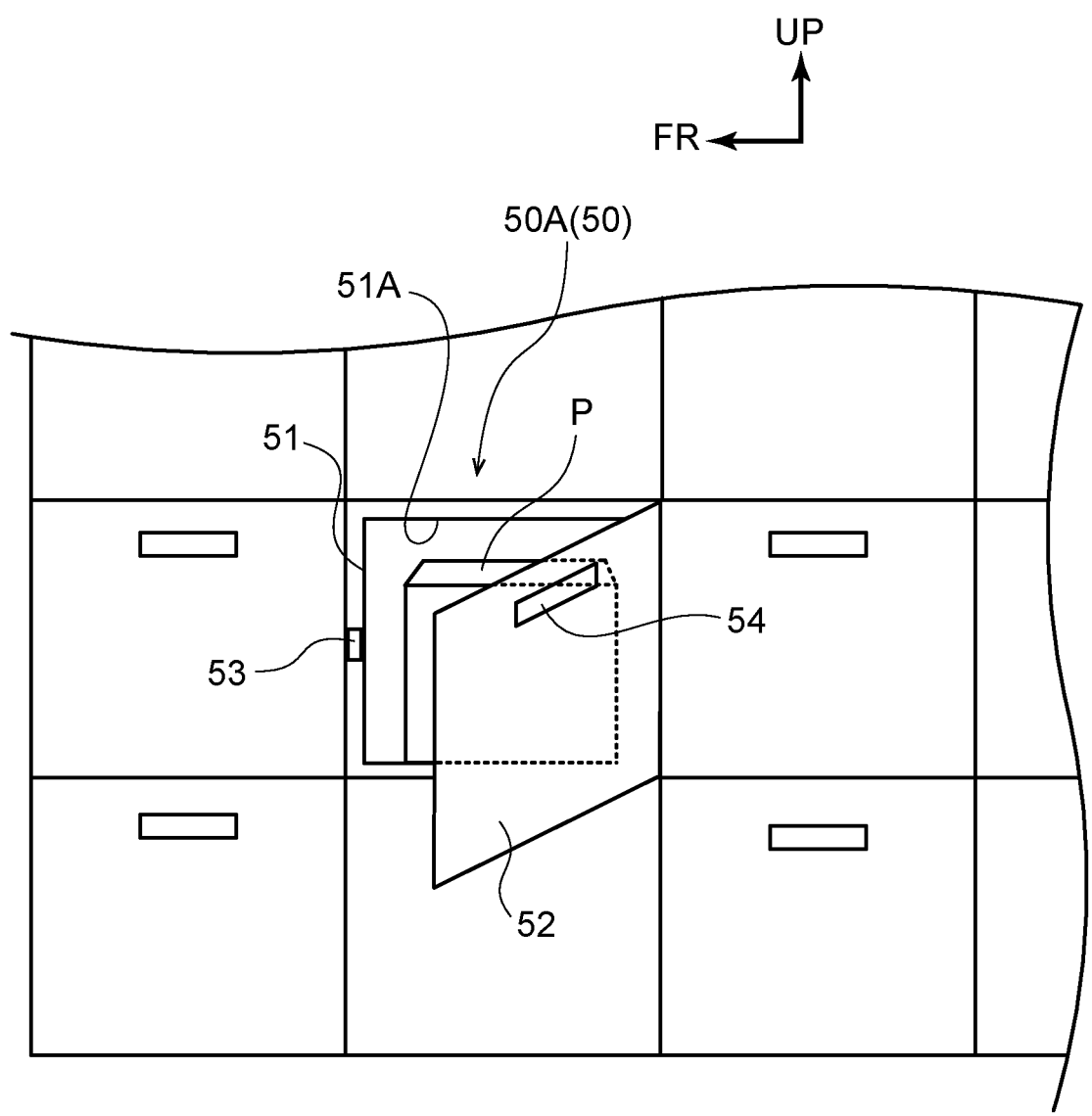
FIG. 3 is a side view of the vehicle cabin showing an example in which a hinge door of a locker has been opened, in the vehicle according to the first embodiment.

As shown in FIG. 1 and FIG. 2, plural lockers SO capable of storing package P are disposed in vehicle cabin 20. As shown in FIG. 3, each locker 50 is box-shaped and has main body part 51 having opening 51A, hinge door 52 that covers opening 51A, lock mechanism 53 that locks hinge door 52, and light 54 provided at hinge door 52, which is a light emitting part.

Hinge door 52 of the present exemplary embodiment is secured, rotatably outward to the near side, to one side in a width direction of opening 51A, and a closed state of opening 51A can be maintained by lock mechanism 53 at the other side in the width direction of opening 51A. Further, hinge door 52 is urged toward the near side by urging means such as a spring in a closed state of opening 51A. Further, hinge door 52 is opened toward the near side by the urging means by a release operation of lock mechanism 53. As a result of this, hinge door 52 adopts an open state and extraction of package P is enabled.

Here, locker 50 corresponds to a transfer section at which package P is transferred to user U, who has boarded the vehicle, and hinge door 52 corresponds to an opening section at which package P is laid open to user U. It should be noted that while hinge door 52 in the present exemplary embodiment is opened toward the near side by the urging means owing to a release operation of lock mechanism 53, the disclosure is not limited to this. For example, hinge door 52 may be configured so as to be directly rotatable by a motor.

Locker 50 of the present exemplary embodiment includes locker 50A disposed at low floor part 21A, locker 50B disposed at front high floor part 21B, and locker 50C disposed at rear high floor part 21C.

A total of twenty units of locker 50A are disposed, at the right-hand side in a vehicle transverse direction of low floor part 21A, with four rows in the vehicle vertical direction and five columns in the vehicle front-rear direction. Locker 50A has hinge door 52 at a vehicle transverse direction left-hand side, and package P can be extracted from opening 51A, which faces the vehicle transverse direction left-hand side.

Further, a total of six units of locker 50B are disposed at front high floor part 21B with two rows in the vehicle vertical direction and three columns in the vehicle transverse direction. Locker 50B has hinge door 52 at the vehicle rear side, and package P can be extracted From opening 51A, which faces the vehicle rear side.

In addition, a total of four units of locker 50C are disposed at rear high floor part 21C with, two rows in the vehicle vertical direction and two columns in the vehicle transverse direction. Locker 50C has hinge door 52 at the vehicle front side, and package P can be extracted from opening 51A, which faces the vehicle front side.

It should be noted that the respective lockers 50 are not limited to storage containers having only the function of storing package P, and may be refrigerators, freezers or heating cabinets. In such cases, there is no need for all of the lockers 50 to be configured uniformly as refrigerators, as freezers or as heating cabinets, and each individual locker 50 may be configured as either a refrigerator, a freezer or a heating cabinet. It should be noted that locker 50 as a refrigerator, a freezer or a heating cabinet may have battery 30 as a power source, or may have another battery provided at power unit chamber 22A or sub-unit chamber 22B as a power source.

In this way, in vehicle cabin 20 of the present exemplary embodiment, boarding space for user U is restricted by lockers 50. In such a case, boarding space is reduced to the extent that the volume and/or number of lockers 50 is increased.

As shown in FIG. 2, turntable 29 is disposed at floor surface 20A toward the vehicle front side and the vehicle transverse direction left-hand side of low floor part 21A. This turntable 29 includes rotary plate 29A configured on the same plane as floor panel 21, and drive device 29B (refer to FIG. 4) that drives rotation of rotary plate 29A. Rotary plate 29A can be mounted by wheelchair W and, in addition, can be mounted by a trolley with caster wheels.

As shown in FIG. 2, entrance 25, through which an adult user U can board or alight by walking, is provided at side wall part 20D at the vehicle transverse direction left-hand side. This entrance 25 is closed by slide door 26, which is secured slidably toward the vehicle front. It should be noted that FIG. 2 shows a state in which, side door 26 is opened toward the vehicle front (the same applies to FIG. 6 and FIG. 7). Further, at entrance 25, ramp 27 is provided, which extends diagonally downward from low floor part 21A toward the pavement (or road). In a case in which vehicle 10 is traveling, ramp 27 is stored at lateral storage part 28 (refer to FIG. 1) provided at a gap between floor panel 21 and battery case 31, and can be pulled out laterally relative to the vehicle from lateral storage part 28 in a use state in which user U boards or alights. This ramp 27 enables travel by wheelchair N (refer to FIG. 6).

Here, ramp 27 of the present exemplary embodiment is stored under the floor at a position that does not overlap with the position at which turntable 29 is installed, in a plan view of vehicle cabin 20. In other words, in a case in which the vehicle cabin 20 is viewed in plan view, the ramp 27 is separated from the turntable 29. That is, as shown in FIG. 1, under the floor, lateral storage part 28 does not overlap with turntable 29 in the vehicle vertical direction.

As shown in FIG. 1, vehicle interior camera 42 is disposed, as a vehicle interior image capture unit, at the vehicle cabin 20 side of side wall part 20D. Further, as shown in FIG. 2, vehicle exterior camera 44 is disposed, as a vehicle exterior image capture unit, at a position at the vehicle exterior side of side wall part 20D that is adjacent to entrance 25. Vehicle interior camera 42 and vehicle exterior camera 44 can both capture images of user U.

Figure 4:
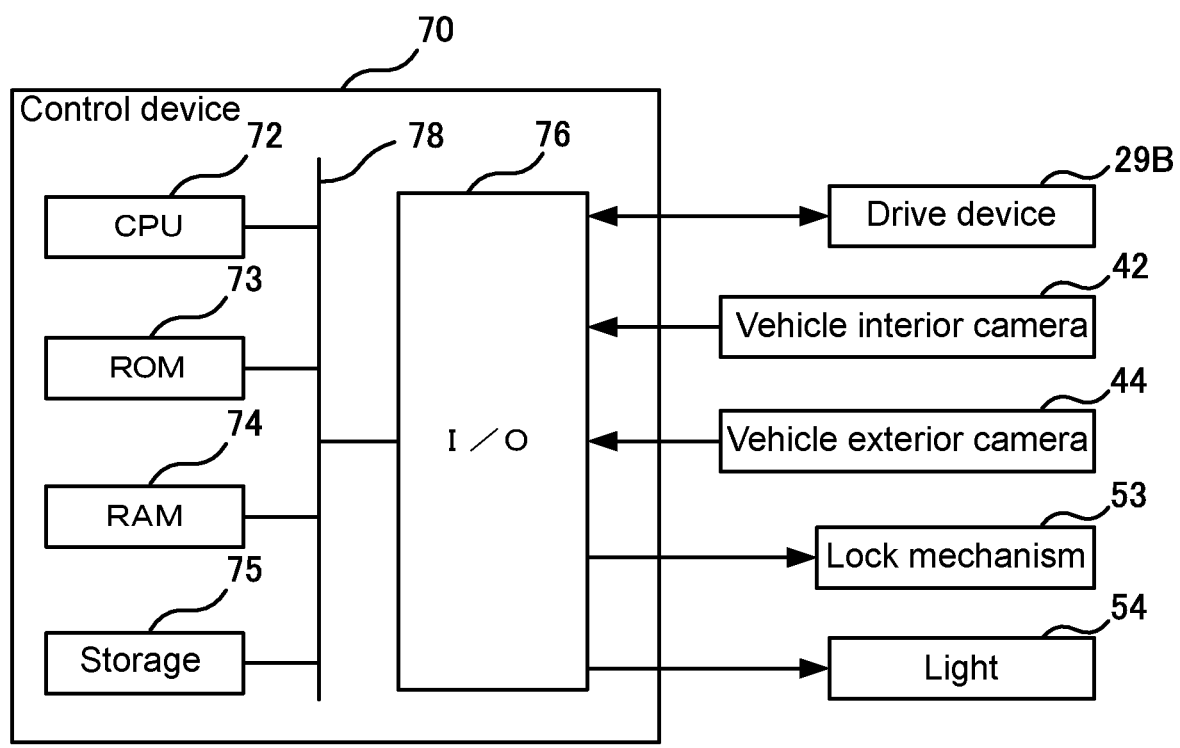
FIG. 4 is a block diagram showing a hardware configuration of a control device of the vehicle according to the first embodiment.

As shown in FIG. 4, control device 70 is provided with central processing unit (CPU) 72, which is one example of a hardware processor, read only memory (ROM) 73, random access memory (RAM) 74, storage 75, and input/output interface (I/O) 76. CPU 72, ROM 73, RAM 74, storage 75 and I/O 76 are connected to each other via bus 78. It should be noted that CPU 72 is an example of a processor and RAM 74 is an example of a memory.

Figure 5:
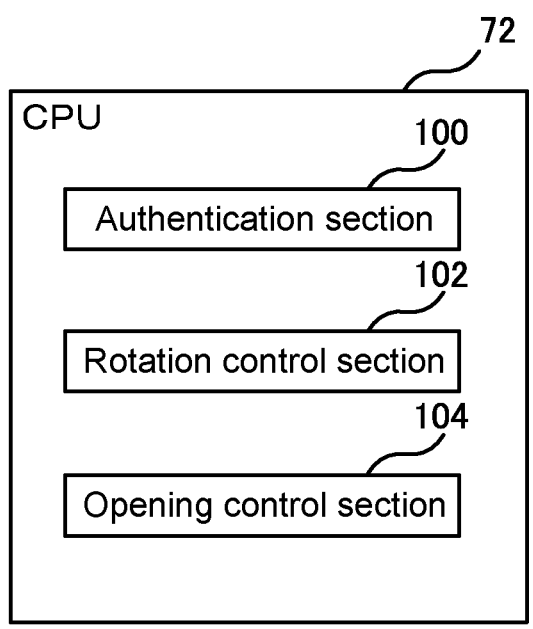
FIG. 5 is a block diagram showing an example of a CPU functional configuration in the control device of the vehicle according to the first embodiment.

CPU 72 is a central processing unit, and executes various kinds of programs and controls respective components. That is, CPU 72 reads a program from ROM 73, and executes the program using RAM 74 as a work area. In the present exemplary embodiment, executable programs are stored at ROM 73. CPU 72 functions as authentication section 100, rotation control section 102 and opening control section 104, which are shown in FIG. 5, by executing executable programs.

ROM 73 stores executable programs for each kind of processing to be executed by CPU 72. RAM 74 temporarily stores programs and/or data as a work area.

Storage 75, which is a storage section, is configured, for example, by a hard disk drive (HDD) or a solid state drive (SSD). Storage 75 stores data related to package P and data required for authentication of user U. For example, data required for authentication of user U might be identification information such as an image of user U's face, or a barcode or two-dimensional code. Further, storage 75 can store footage captured by vehicle interior camera 42 and vehicle exterior camera 44.

Drive device 29B of turntable 29, vehicle interior camera 42, vehicle exterior camera 44, and lock mechanism 53 and light 54 of each locker 50 are connected to I/O 76. It should be noted that I/O 76 and the respective devices may be connected via various kinds of electronic control unit (ECU).

FIG. 5 is a block diagram showing an example of the functional configuration of CPU 72 of the present exemplary embodiment. CPU 72 has authentication section 100, rotation control section 102 and opening control section 104. The respective functional configurations are realized by CPU 72 reading executable programs stored at ROM 73 and executing these.

Authentication section 100 has a function of authenticating whether or not a person present at the vehicle exterior is user U having permission to enter vehicle cabin 20. Authentication section 100 of the present exemplary embodiment, by means of face authentication, determines whether or not an image of the face of the person present at the vehicle exterior captured by vehicle exterior camera 44, and an image of the face of user U recorded in advance and stored at storage 75, are a match, and in a case in which a match is determined, provides authentication. It should be noted that the authentication method employed by authentication section 100 is not limited to face authentication, and may be an authentication method using an authentication image that is an image of identification information such as a barcode or a two-dimensional code. In such a case, it is possible for an authentication image displayed on the screen, of a smartphone or the like held by user U to be captured by vehicle exterior camera 44, for it to be determined whether or not the information included in the captured authentication image, and information related to user U recorded in advance and stored at storage 75, are a match, and in a case in which a match is determined, for authentication to be performed.

Rotation control section 102 has a function of rotatably controlling turntable 29. Rotation control section 102 of the present exemplary embodiment can effect driving of drive device 29B and rotate rotary plate 29A based on footage of user U seated in wheelchair W captured by vehicle interior camera 42. Specifically, rotation control section 102 analyzes an image captured by vehicle interior camera 42, and in a case in which it is determined that wheelchair W has arrived on rotary plate 29A, rotates rotary plate 29A. Further, rotation control section 102 can effect driving of drive device 29B and rotate rotary plate 29A based on the transfer of package P to user U at locker 50. For example, rotation control, section 102 analyzes an image captured by vehicle interior camera 42 and rotates rotary plate 29A in a case in which it is determined that user U has received package P from locker 50.

Opening, control section 104 has a function of activating slide door 26 to open entrance 25 and, in addition, of opening hinge door 52. Specifically, in a case in which authentication section 100 has authenticated user U, opening control section 104 moves slide door 26 toward the vehicle front and opens entrance 25. As a result of this, user U can enter vehicle cabin 20. Further, opening control section 104 effects a release operation of lock mechanism 53 of locker 50 in which package P for transfer to user U is accommodated, at almost the same timing as the opening of entrance 25. As a result of this, user U can extract package P from locker 50.

(Action)

The flow according to which user U receives package P from vehicle 10 in the present exemplary embodiment is explained. First, vehicle 10, carrying package P addressed to a specific user U, stops at the nearest location to the residence or the like of user U. At such time, notification of the arrival of vehicle 10 can be provided to user U via a smartphone or the like. Further, vehicle 10 can be summoned by a smartphone or the like and the receipt of package P can be performed at user U's preferred timing.

Next, authentication processing is executed when user U stands in front of slide door 26 (specifically, vehicle exterior camera 44) of vehicle 10. As discussed above, CPU 72, functioning as authentication section 100, performs face authentication and performs a determination as to whether or not there is a match with a prerecorded user U. In a case in which there is a match between the user U and a prerecorded user U, authentication section 100 provides authentication.

Further, based on the authentication of user U, opening control section 104 opens entrance 25 and, in addition, opens hinge door 52 of locker 50 in which package P of user U is accommodated. Further, user U extracts and receives package P addressed to user U from the locker 50 with an opened hinge door 52.

Figure 6:
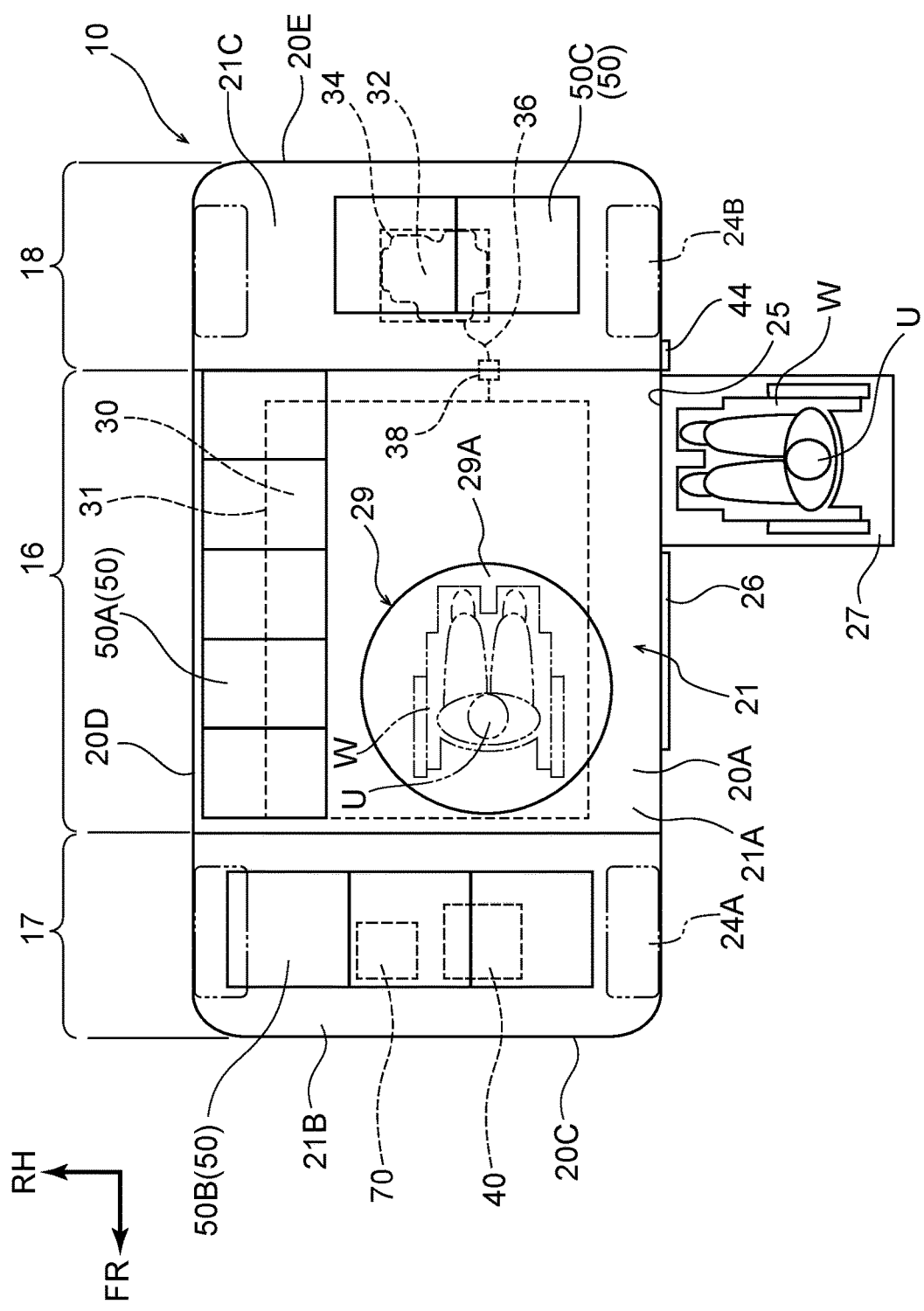
FIG. 6 is a plan view showing an example in which a wheelchair user has boarded the vehicle according to the first embodiment.

As shown in FIG. 6, vehicle 10 of the present exemplary embodiment is provided with ramp 27 extending outward to the vehicle exterior at entrance 25, and it is possible for user U seated in wheelchair W or user U using a trolley to board vehicle 10. Further, vehicle 10 of the present exemplary embodiment is provided with turntable 29 at floor surface 20A inside vehicle cabin 20 that has been boarded, and it is possible to change the direction of wheelchair W or of a trolley. Accordingly, in vehicle 10 of the present exemplary embodiment, it is possible to secure room to move for user U seated in wheelchair W or user U using a trolley even inside vehicle cabin 20 having confined boarding space owing to the disposal of locker 50.

Further, in the present exemplary embodiment, ramp 27 is stored under the floor at a position that does not overlap with the position at which turntable 29 is installed in a plan view of vehicle cabin 20. In other words, in a case in which the vehicle cabin 20 is viewed in plan view, the ramp 27 is separated from the turntable 29. Accordingly, in vehicle 10 of the present exemplary embodiment, it is possible to realize a lower floor of vehicle cabin 20 compared to a case in which the installment position of turntable 29 and the storage position of ramp 27 overlap in plan view. Further, owing to the lowered floor of vehicle cabin 20, user U in wheelchair W can easily embark since the angle of ramp 27 can be reduced. Further, in conjunction with the lowered floor of vehicle cabin 20, the volume and number of lockers 50 at low floor part 21A can be increased and the storage amount of package P can be increased.

Further, in the present exemplary embodiment, CPU 72, functioning as rotation control section 102, rotatably controls turntable 29 based on footage of user U seated on, wheelchair W captured by vehicle interior camera 42. That is, in vehicle 10 of the present exemplary embodiment, turntable 29 can be rotated in a case in which user U, who has boarded, is seated in wheelchair W.

Further, in the present exemplary embodiment, while user U can receive package P at locker 50, CPU 72, functioning as rotation control section 102, can rotate turntable 29 based on the transfer of package P to user U at locker 50. As a result of this, the operational burden on user U using wheelchair W or a trolley can be reduced.

Vehicle 10 of the present exemplary embodiment is an autonomous driving vehicle that does not necessarily require a driver to be aboard. CPU 72, provided at vehicle 10, functions as authentication section 100, which authenticates the entry of user U into vehicle cabin 20, and as opening control section 104, which performs processing in a ease of authentication. Further, opening control section 104 opens entrance 25 and, in addition, opens hinge door 52 of locker 50 at which package P of user U is stored. Accordingly, in vehicle 10 of the present exemplary embodiment, since the opening of entrance 25 and the opening of hinge door 52 can be performed via a single authentication, the inconvenience of user U performing a two-stage verification can be eliminated.

It should be noted that in the present exemplary embodiment, in conjunction with a release operation, of lock mechanism 53, hinge door is opened outward toward the near side by urging means; however, in a case in which urging means are not provided, user U may open hinge door 52 him/herself, in such a case, CPU 72, functioning as opening control section 104, may cause light 54 of locker 50 to emit light—that is, to be turned on or to flash—so as to enable identification of the locker 50 at which lock mechanism 53 has been released. As a result of this, user U can easily recognize the location of his/her own package P inside vehicle cabin 20.

Further, turntable 29 in the present exemplary embodiment is operated by electric power; however, manual operation is acceptable. Even with a manually operated turntable 29, the direction of wheelchair W or a trolley can be changed inside vehicle cabin 20 and it is possible to disembark safely.

Second Embodiment

Vehicle 10 of the first embodiment is configured such that user U moves within vehicle cabin 20 and receives package P; however, vehicle 10A of the second, embodiment features the package being moved to table 82, which can be reached by the hands of user U. In the following, explanation is made principally of points of difference with the first embodiment. It should be noted that configuration that is identical with the first embodiment is assigned the same reference numeral and explanation thereof is omitted.

(Configuration)

Figure 7:
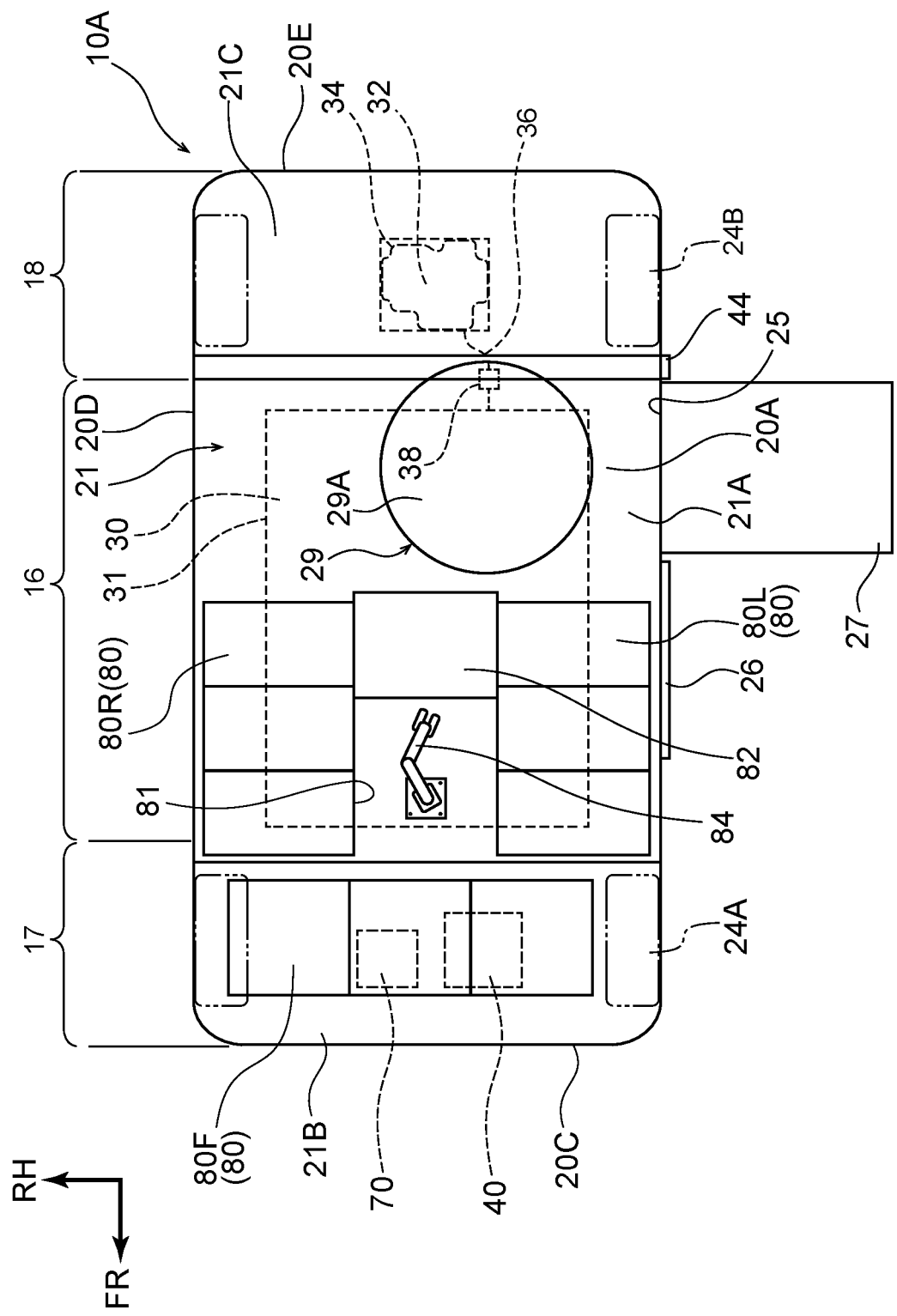
FIG. 7 is a plan view of a vehicle cabin in a vehicle according to a second embodiment.

As shown in FIG. 7, plural racks 80, partitioned by boards, at which package P can be accommodated are disposed in vehicle cabin 20. Each rack 80 is box-shaped and is has opening 81 at least at a side adjacent to robot arm 84, which is described below.

Rack 80 in the present exemplary embodiment, includes rack 80R and rack 80L disposed at a vehicle front side, and at respective sides in the vehicle transverse direction, of low floor part 21A, and rack 80F disposed at front high floor part 21B.

A total of twelve units of rack 80R are disposed at low floor part 21A with four rows in the vehicle vertical direction and three columns in the vehicle front-rear direction. At rack 80R, package P can be extracted from opening 81, which faces the vehicle transverse direction left-hand side.

A total of twelve units of rack 80L are disposed at low floor part 21A with four rows in the vehicle vertical direction and three columns in the vehicle front-rear direction. At rack 80L, package P can be extracted from opening 81, which faces the vehicle transverse direction right-hand side.

Further, a total of six units of rack 8OF are disposed at front high floor part 21B with two rows in the vehicle vertical direction and three columns in the vehicle transverse direction. At rack 80F, package P can be extracted from opening 81, which faces the vehicle rear side.

At a substantial center, in the vehicle front-rear direction, of low floor part 21A, and at a position sandwiched between rack 80R and rack 80L, table 82, at which package P can be placed, is disposed. Table 82 is disposed adjacent to a boarding space for user U in vehicle cabin 20, and corresponds to a receiving section at which user U receives package P Further, robot arm 84, which is a movement mechanism for moving package P from respective racks 80 to table 82, is disposed at a position that is at a vehicle front side of table 82 and that is sandwiched between rack 80R and rack 80L at respective sides, in the vehicle transverse direction, of low floor part 21A. This robot arm 84 has a base portion that is secured relative to floor panel 21.

Figure 8:
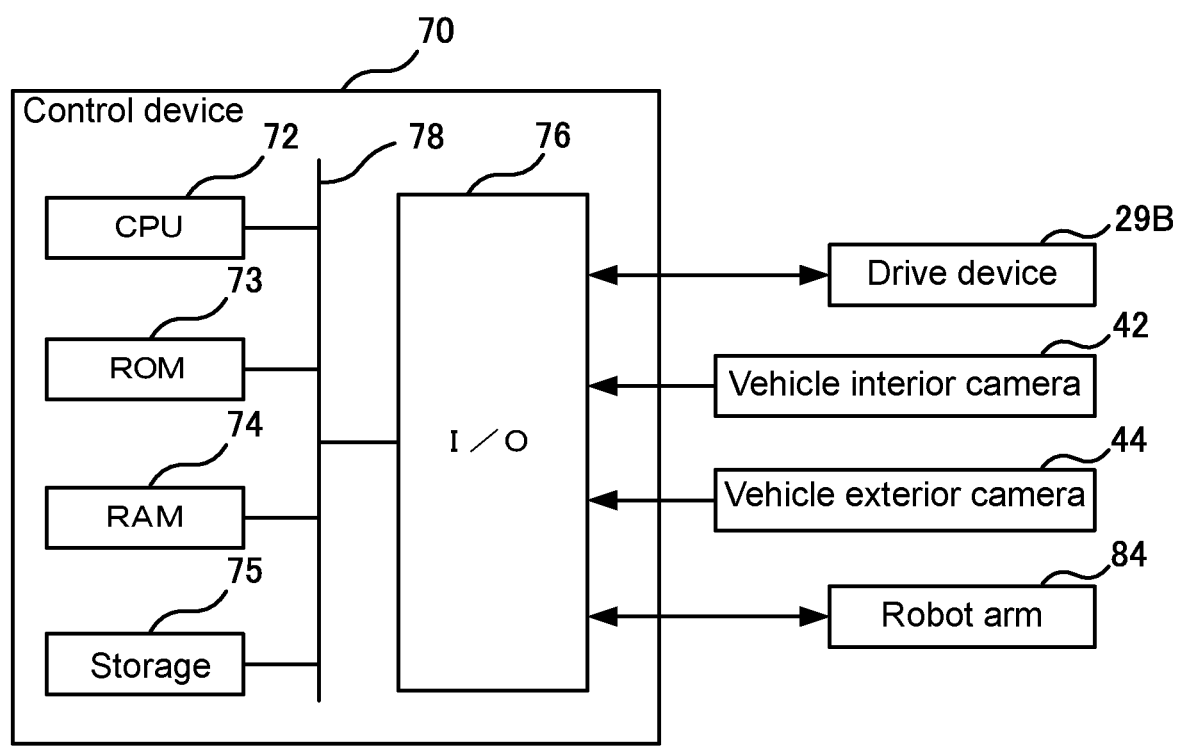
FIG. 8 is a block diagram showing a hardware configuration of a control device of the vehicle according to the second embodiment.

As shown in FIG. 8, control device 70 of the present exemplary embodiment is connected to drive device 29B of turntable 29, vehicle interior camera 42, vehicle exterior camera 44, and robot arm 84 at I/O 76. Further, CPU 72 of the present exemplary embodiment functions as authentication section 100, rotation control section 102, and package control section 106, which are shown in FIG. 9, by executing executable programs.

Figure 9:
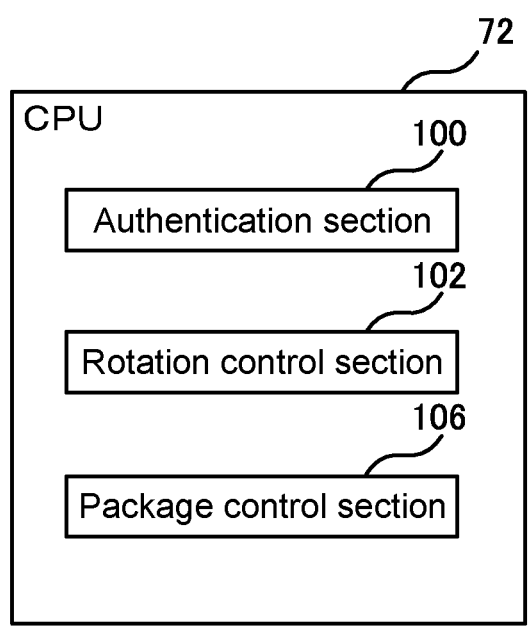
FIG. 9 is a block diagram showing an example of a CPU functional configuration in the control device of the vehicle according to the second embodiment.

FIG. 9 is a block diagram showing an example of a functional configuration of CPU 72 of the present exemplary embodiment. CPU 72 has authentication section 100, rotation control section 102, and package control section 106.

Package control section 106 has the function of operating slide door 26 to open entrance 25 and, in addition, of operating robot arm 84. Specifically, package control section 106 opens entrance 25 by moving slide door 26 toward the vehicle front in a case in which authentication section 100 has authenticated user U. Further, package control section 106 causes robot arm 84 to move package P for transfer to user U from rack SO to table 82 at almost the same timing as the opening of entrance 25.

(Action)

The flow according to which user U receives package P from vehicle 10A in the present exemplary embodiment is explained. The process from vehicle 10A stopping until authentication of user U is the same as in the first embodiment.

Next, based on the authentication of user U, package control section 106 opens entrance 25 and, in addition, causes robot arm 84 to move package P for transfer to user U from rack 80 to table 82. As a result of this, user U can extract package P from table 82.

In the foregoing, in vehicle 10A of the present exemplary embodiment, package P can be moved to table 82, which can be reached by the hands of user U, without user U moving through vehicle cabin 20 in order to receive package P. Further, in the present exemplary embodiment, table 82 is provided in a range such that it can be reached by the hands of user U who is present on turntable 29. Therefore, in the present exemplary embodiment, at a time of receiving package P, the burden on user U using wheelchair W or a trolley can be reduced.

[Supplement]

In the respective embodiments described above, drive unit 32 and power unit 34 are disposed at power unit chamber 22A at the vehicle rear part, and autonomous driving unit 40 is disposed at sub-unit chamber 22B at the vehicle front part; however, the disclosure is not limited to this. For example, the front-rear arrangement of the vehicle may be switched around so as to provide the power unit chamber, and dispose drive wilt 32 and power unit 34, at the vehicle front part and so as to provide the sub-unit chamber, and dispose autonomous driving unit 40, at the vehicle rear part. Further, for example, all of drive unit 32, power unit 34 and autonomous driving unit 40 may be disposed at a power unit chamber provided at either one of the vehicle front part or the vehicle rear part.

The respective embodiments described above are fully autonomous driving vehicles without a driver seat; however, the disclosure is not limited to this and an autonomous driving vehicle having a driver seat is acceptable. That is, in the respective embodiments, it is possible to have autonomous driving performed normally and to enable manual driving in, order to avoid danger or at a given timing.

What is claimed is:

1. A vehicle, comprising:
a vehicle cabin having a flat floor surface and being configured such that a user can embark;
an entrance through which the user can embark and can disembark;
a ramp that, at the entrance, extends from the floor surface toward a vehicle exterior;
a turntable that is provided at the floor surface, the turntable is configured to enable to be mounted by a wheelchair, and the turntable is configured to enable directional change;
a memory;
a processor coupled to the memory; and
a vehicle interior imaging section that images an interior of the vehicle cabin,
wherein the processor rotatably controls the turntable based on an image, captured by the vehicle interior imaging section, of a user seated in the wheelchair in the vehicle cabin.

2. The vehicle recited in claim 1, wherein the ramp is stored under the floor surface at a position that is separated from an installment position of the turntable in a case in which the vehicle cabin is viewed in plan view.

3. The vehicle recited in claim 1, further comprising a transfer section that is provided at the vehicle cabin and that is configured to enable transfer of a package to the user, wherein the processor rotates the turntable based on a transfer of the package to the user at the transfer section.

4. The vehicle recited in claim 1, further comprising:
a control unit that controls autonomous driving of the vehicle; and
an opening section provided at the vehicle cabin, which makes an accommodated package available to the user in a specific open state,
wherein the processor authenticates a person present at the vehicle exterior as a user who is permitted to embark the vehicle cabin, and, in a case in which the user has been authenticated, opens the entrance and places the opening section in the open state.

5. The vehicle recited in claim 1, further comprising:
a control unit that controls autonomous driving of the vehicle;
a receiving section configured to enable the user on the turntable to receive a package; and
a movement mechanism that moves the package to the receiving section based on authentication of the user,
wherein the processor authenticates the user coming aboard at the entrance and rotates the turntable in a case in which the user has received the package that has been moved to the receiving section.

6. The vehicle recited in claim 1, further comprising:
a control unit that controls autonomous driving of the vehicle;
a plurality of opening sections provided at the vehicle cabin, which make an accommodated package available to the user; and
a light emitting section provided at a front surface of each of the opening sections,
wherein the processor authenticates a person present at the vehicle exterior as a user who is permitted to embark the vehicle cabin, and, in a case in which the user has been authenticated, opens the entrance and causes the light emitting section of an opening section corresponding to the user's package to emit light.

7. The vehicle recited in claim 4, further comprising a vehicle exterior imaging section provided adjacent to the entrance, which images the vehicle exterior, wherein the processor performs authentication based on a condition that an image of a face captured by the vehicle exterior imaging section is a match with an image of the user's face.

8. The vehicle recited in claim 7, wherein the processor performs authentication based on a condition that identification information captured by the vehicle exterior imaging section is a match with identification information stored in advance at a storage section.

9. A vehicle, comprising:
a vehicle cabin having a flat floor surface and being configured such that a user can embark;
an entrance through which the user can embark and can disembark;
a ramp that, at the entrance, extends from the floor surface toward a vehicle exterior;
a turntable that is provided at the floor surface and that is configured to enable directional change;
a vehicle interior imaging section that images an interior of the vehicle cabin;
a memory; and
a processor coupled to the memory, the processor rotatably controls the turntable based on an image, captured by the vehicle interior imaging section, of a user seated in a wheelchair in the vehicle cabin.

10. The vehicle recited in claim 9, wherein the ramp is stored under the floor surface at a position that is separated from an installment position of the turntable in a case in which the vehicle cabin is viewed in plan view.

11. The vehicle recited in claim 9, further comprising a transfer section that is provided at the vehicle cabin and that is configured to enable transfer of a package to the user, wherein the processor rotates the turntable based on a transfer of the package to the user at the transfer section.

12. The vehicle recited in claim 9, further comprising:
a control unit that controls autonomous driving of the vehicle; and
an opening section provided at the vehicle cabin, which makes an accommodated package available to the user in a specific open state,
wherein the processor authenticates a person present at the vehicle exterior as a user who is permitted to embark the vehicle cabin, and, in a case in which the user has been authenticated, opens the entrance and places the opening section in the open state.

13. The vehicle recited in claim 9, further comprising:
a control unit that controls autonomous driving of the vehicle;
a receiving section configured to enable the user on the turntable to receive a package; and
a movement mechanism that moves the package to the receiving section based on authentication of the user,
wherein the processor authenticates the user coming aboard at the entrance and rotates the turntable in a case in which the user has received the package that has been moved to the receiving section.

14. The vehicle recited in claim 9, further comprising:
a control unit that controls autonomous driving of the vehicle;
a plurality of opening sections provided at the vehicle cabin, which make an accommodated package available to the user; and
a light emitting section provided at a front surface of each of the opening sections,
wherein the processor authenticates a person present at the vehicle exterior as a user who is permitted to embark the vehicle cabin, and, in a case in which the user has been authenticated, opens the entrance and causes the light emitting section of an opening section corresponding to the user's package to emit light.

15. The vehicle recited in claim 9, further comprising a vehicle exterior imaging section provided adjacent to the entrance, which images the vehicle exterior, wherein the processor performs authentication based on a condition that an image of a face captured by the vehicle exterior imaging section is a match with an image of the user's face.

16. The vehicle recited in claim 9, wherein the processor performs authentication based on a condition that identification information captured by the vehicle exterior imaging section is a match with identification information stored in advance at a storage section.

* * * * *